US009648056B1

(12) United States Patent
Kim et al.

(10) Patent No.: US 9,648,056 B1
(45) Date of Patent: May 9, 2017

(54) GEOGRAPHIC CONTENT DISCOVERY

(71) Applicant: Amazon Technologies, Inc., Reno, NV (US)

(72) Inventors: Mitchell Kim, Irvine, CA (US); Dave Mohla, Irvine, CA (US); Devesh Khare, Tustin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 13/676,753

(22) Filed: Nov. 14, 2012

(51) Int. Cl.
G06Q 30/00 (2012.01)
H04L 29/06 (2006.01)
G06Q 30/02 (2012.01)

(52) U.S. Cl.
CPC ......... H04L 65/40 (2013.01); G06Q 30/0235 (2013.01)

(58) Field of Classification Search
CPC ............... G06Q 50/01; G06Q 30/0282; G06Q 30/0625; G06Q 30/0261; G06Q 30/0251
USPC .......... 705/14.55, 7.25, 14.49, 14.58, 14.57, 705/14.64, 14.66, 14.67, 14.5, 14
See application file for complete search history.

(56) References Cited

U.S. PATENT DOCUMENTS

| | | | | |
|---|---|---|---|---|
| 8,145,532 B2* | 3/2012 | Jones | ................ | G06Q 30/0207 705/26.1 |
| 8,438,055 B2* | 5/2013 | Levi et al. | ................. | 705/14.26 |
| 8,655,829 B2* | 2/2014 | Flinn et al. | ...................... | 706/52 |
| 8,671,021 B2* | 3/2014 | Maharajh et al. | ......... | 705/14.66 |
| 8,996,234 B1* | 3/2015 | Tamari | ..................... | G08G 1/20 701/123 |
| 2006/0098588 A1* | 5/2006 | Zhang | .................. | H04L 67/104 370/255 |
| 2006/0270421 A1* | 11/2006 | Phillips | .............. | G08B 21/0236 455/457 |
| 2007/0299681 A1* | 12/2007 | Plastina | ................. | G06Q 30/02 705/51 |
| 2008/0065505 A1* | 3/2008 | Plastina | ................. | G06Q 30/02 705/27.1 |
| 2008/0066181 A1* | 3/2008 | Haveson et al. | ................ | 726/26 |
| 2010/0293050 A1* | 11/2010 | Maher et al. | .............. | 705/14.46 |
| 2011/0035284 A1* | 2/2011 | Moshfeghi | ................. | 705/14.58 |
| 2011/0256881 A1* | 10/2011 | Huang | .................. | G01S 5/0257 455/456.1 |
| 2011/0260860 A1* | 10/2011 | Gupta | ...................... | 340/539.13 |
| 2012/0005013 A1* | 1/2012 | Ramer et al. | .............. | 705/14.46 |
| 2012/0026971 A1* | 2/2012 | Khandelia | ........... | H04W 36/005 370/331 |

(Continued)

FOREIGN PATENT DOCUMENTS

CN 103391511 A * 11/2013

OTHER PUBLICATIONS

Bo Yan and Guanling Chen, AppJoy: Personalized Mobile Application Discovery, Department of Computer Science, University of Massachusetts Lowell, Apr. 2011.*

Primary Examiner — Matthew L Hamilton
(74) Attorney, Agent, or Firm — Thomas | Horstemeyer, LLP

(57) ABSTRACT

Disclosed are various embodiments for a geographic content discovery application. The geographic location of a client device is determined. Opportunities to obtain content are communicated to the client responsive to the client device being located in a defined geographic boundary. The content may be determined as a function of relevance, incentives associated with the geographic boundary, or nearby clients.

24 Claims, 8 Drawing Sheets

(56) References Cited

U.S. PATENT DOCUMENTS

| | | | |
|---|---|---|---|
| 2012/0136949 A1* | 5/2012 | Virani | H04L 12/582 709/206 |
| 2012/0136998 A1* | 5/2012 | Hough et al. | 709/225 |
| 2012/0215640 A1* | 8/2012 | Ramer et al. | 705/14.55 |
| 2012/0276928 A1* | 11/2012 | Shutter | 455/456.3 |
| 2012/0284256 A1* | 11/2012 | Mahajan | G06F 17/3087 707/722 |
| 2012/0290584 A1* | 11/2012 | De Bona et al. | 707/741 |
| 2012/0297466 A1* | 11/2012 | Li | G06F 21/10 726/7 |
| 2013/0054335 A1* | 2/2013 | Kjelsbak et al. | 705/14.26 |
| 2013/0054422 A1* | 2/2013 | DeSouza | G06Q 30/00 705/27.1 |
| 2013/0073388 A1* | 3/2013 | Heath | 705/14.53 |
| 2013/0191215 A1* | 7/2013 | Metcalf | 705/14.58 |
| 2013/0212065 A1* | 8/2013 | Rahnama | 707/609 |
| 2013/0297690 A1* | 11/2013 | Lucero et al. | 709/204 |
| 2014/0012917 A1* | 1/2014 | Baca | G06Q 50/30 709/204 |
| 2015/0009152 A1* | 1/2015 | Tang | G09G 5/12 345/173 |
| 2015/0065172 A1* | 3/2015 | Do | H04L 63/107 455/456.3 |

\* cited by examiner

GEOGRAPHIC CONTENT DISCOVERY

BACKGROUND

Mobile devices can incorporate elements to determine the geographic location of the mobile device. Content may be available that is more relevant based on the geographic location of the mobile device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Mobile devices such as smartphones or tablet computers commonly implement functionality to determine the geographic location of the mobile device. Such functionality may be implemented by Global Positioning System (GPS) receivers, satellite navigation system receivers, or other devices or applications. Content may be available for these mobile devices that is more relevant as a function of the geographic location of the device. For example, applications created for an amusement park or other public attraction would be more relevant to a mobile device in the proximity of the attraction. Content obtained and shared by nearby mobile devices may be more relevant to a user. Additionally, content may be made available for free or at a discount while the mobile device is in a geographic boundary.

A geographic content discovery application facilitates the acquisition of geographically relevant content by mobile devices. The geographic content distribution service may obtain the geographic location of a mobile device and determine if the mobile device is in one or more defined geographic boundaries. If the mobile device is within a geographic boundary, the geographic content distribution service may then communicate a selection of available content to the mobile device as a function of the occupied geographic boundary. The selection may be content relevant to the occupied boundary, content that is discounted or complementary while the mobile device is within the geographic boundary, content shared by other mobile devices within the boundary, or other content.

In the following discussion, a general description of the system and its components is provided, followed by a discussion of the operation of the same.

Figure 1:
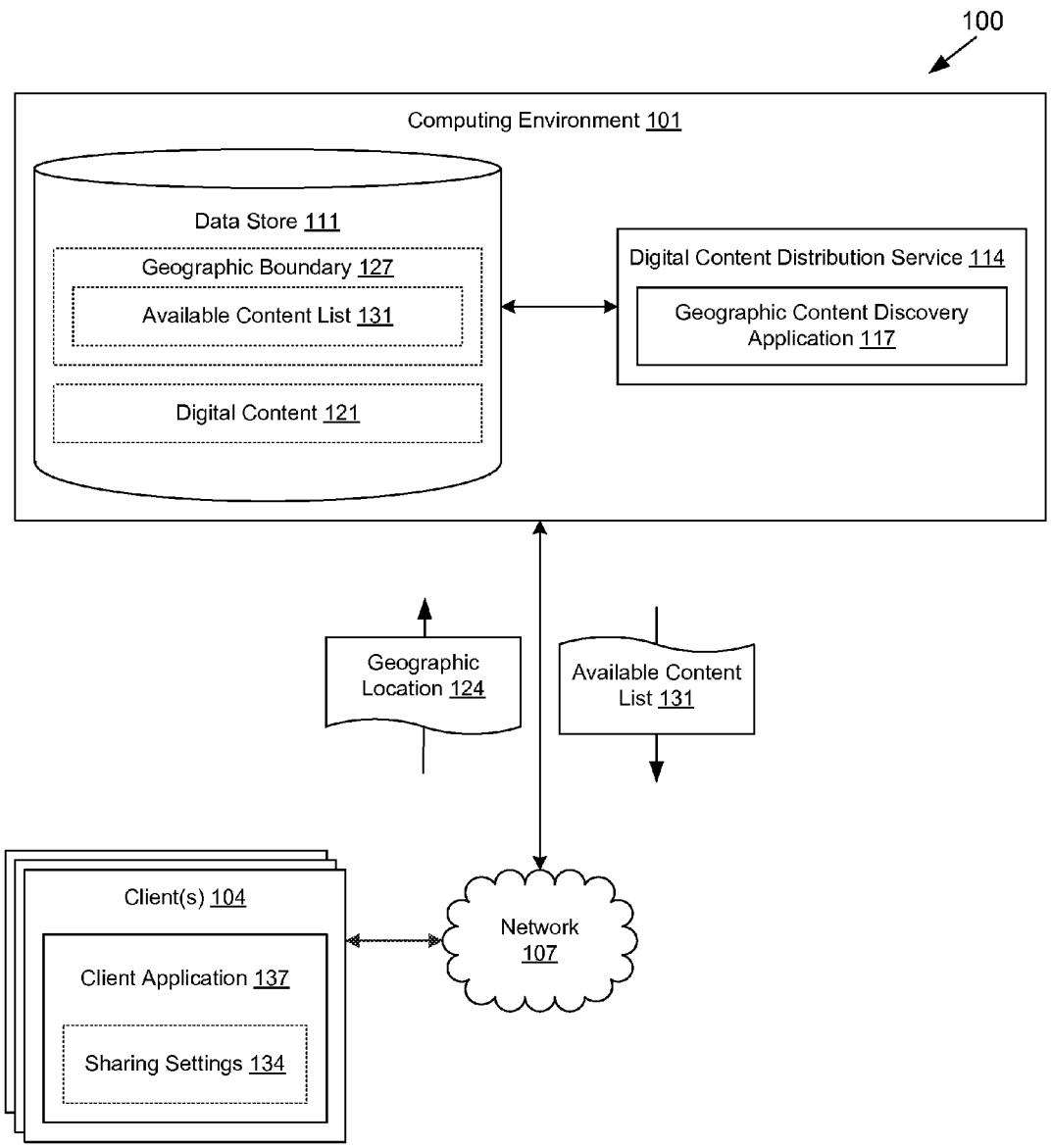
FIG. 1 is a drawing of a networked environment according to various embodiments of the present disclosure.

With reference to FIG. 1, shown is a networked environment 100 according to various embodiments. The networked environment 100 includes a computing environment 101, and client devices 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a digital content distribution service 114 having a geographic content discovery application 117, and other applications, services, processes, systems, engines, or functionality not discussed in detail herein. The digital content distribution service 114 is executed to facilitate the purchase, rental, or other acquisition of digital content 121 by clients 104. The digital content distribution service 114 may comprise an application store, an electronic commerce system, or other functionality. The digital content distribution service 114 may consummate financial transactions with respect to clients 104 for the purchase or rental of digital content 121. Digital content 121 may comprise applications executable by a client 104, additional functionality for an already downloaded application or content executable by a client 104 such as an in-application purchase, or other functionality.

The geographic content discovery application 117 facilitates the discovery of digital content 121 by clients 104 as a function of the geographic location 124 of the clients 104. The geographic content discovery application 117 may obtain the geographic location 124 of a client 104 and determine if the client 104 is within one or more geographic boundaries 127. The geographic boundaries 127 may be predefined or dynamically determined. In some embodiments, a geographic boundary 127 comprises at least one reference point and at least one radius applied to each reference point. The reference points may correspond to predefined geographic locations 124, geographic locations of clients 104, or other data. In such embodiments, the client 104 is within the geographic boundary 127 if the geographic location 124 falls within the area of a circle generated by the at least one reference point and at least one radius.

In other embodiments, the geographic boundary 127 comprises a plurality of reference points linked to form a polygon. In such an embodiment, the client 104 is within the geographic boundary 127 if the geographic location 124 is within the area of the polygon. In further embodiments, the geographic boundary 127 is dynamically generated as a function of weather patterns, traffic patterns, population densities, or other data.

The geographic content discovery application 117 may also generate an available content list 131 responsive to the client 104 being within a geographic boundary 127. The available content list 131 comprises a listing of digital content 121 relevant to the occupied geographic boundary 127. The available content list 131 facilitates a download, purchase, rental, or other acquisition of the digital content 121 embodied in the content list 131 by a client 104.

The available content list 131 may be predefined and associated with one or more geographic boundaries 127. For example, a geographic boundary 127 embodying an amusement park may be associated with a predefined available content list 131 of digital content 121 relevant to the amusement park. As another example, a geographic boundary 127 embodying a coffee shop may be associated with a predefined available content list 131 of digital content 121 comprising unlocked or available functionality while the client 104 is within the geographic boundary 127. Examples of such digital content include content which is free to use while the client 104 is within the geographic boundary 127, or other content.

In other embodiments, the available content list 131 may be generated as a function of other clients 104. For example, the geographic boundary 127 may comprise reference points and radii corresponding to nearby clients 104. The nearby clients 104 may implement functionality to share acquired digital content 121 to other clients 104. The available content list 131 may embody that digital content 121 shared by the nearby clients 104. The digital content 121 may be shared as a function of sharing settings 134 implemented on one of the nearby clients 104, or as a function of other data.

The sharing settings 134 may define a subset of digital content 121 stored on a client 104 for sharing. The sharing settings 134 may also define a subset of other clients 104 to whom the digital content 121 is shared. The subset of other clients 104 may be define with respect to specific clients 104, groups of clients 104, user accounts associated with clients 104, or other data. Sharing settings 134 may also define other criteria for sharing digital content 121.

The available content list 131 may also be generated as a function of a number of nearby clients 104 having commonly stored digital content 121. For example, the available content list 131 may comprise at least one digital content 121 that is stored on a majority of nearby clients or stored on a number of nearby clients 104 exceeding a threshold. Other thresholds and functions of the nearby clients 104 may also be used to generate the available content list 131.

Additionally, the digital content 121 embodied in the available content list 131 may be associated with a discount or other incentive. The incentive may expire upon the client 104 exiting the geographic boundary, expire after a period of time triggered upon the client 104 exiting the geographic boundary, or expire after some other event. In some embodiments, the associated incentive may not expire.

The data stored in the data store 111 includes, for example, geographic boundaries 127, digital content 121, and potentially other data. The geographic boundaries 127 may be associated with available content lists 131, or other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 137 and/or other applications. The client application 137 may be executed in a client 104, for example, to access network content served up by the computing environment 101 and/or other servers. To this end, the client application 137 may comprise, for example, a browser, a dedicated application, etc. The client 104 may be configured to execute applications beyond the client application 137 such as, for example, email applications, social networking applications, word processors, spreadsheets, and/or other applications.

Next, a general description of the operation of the various components of the networked environment 100 is provided. To begin, the client 104 communicates a geographic location 124 of the client 104 to the geographic content discovery application 117. The geographic location 124 may be generated by a GPS receiver, satellite receiver, or other hardware functionality implemented in the client 104. The geographic location 124 may also be generated by client applications 137 or other functionality implemented on the client 104.

The communicating the geographic location 124 may be facilitated by a client application 137. In such an embodiment, the client application 137 may comprise a dedicated application for interacting with a digital content distribution service 114 or another type of application. In other embodiments, communicating the geographic location 124 may be facilitated by digital content 121 executed on the client 104. In such an embodiment, the geographic location 124 may be communicated by logic or functionality implemented in the digital content 121 such as an application program interface call, or by digital rights management applied to the digital content 121. The geographic location 124 may be communicated by another approach, as well.

Next, the geographic content discovery application 117 may determine if the client 104 is within a geographic boundary 127 as a function of the obtained geographic location 124. Determining whether the client 104 is within a geographic boundary 127 may comprise determining whether the geographic location 124 is within an area of a circle defined by a reference point and a radius. The reference point may be predefined, determined as a function of a client 104 geographic location 124, or by another approach. In other embodiments, determining if the client is within a geographic boundary 127 may comprise determining whether the geographic location 124 is within a polygon defined by a plurality of connected reference points. Other approaches may also be used to determine if the geographic location 124 is within a geographic boundary 127.

If the geographic location 124 of the client is within a geographic boundary 127, the geographic content distribution service 114 may generate an available content list 131 for communication to the client 104. In some embodiments, the available content list 131 is predefined with respect to a geographic boundary 127. In other embodiment, the available content list 131 is generated as a function of nearby clients 104 whose geographic locations 124 are within a geographic boundary 127 defined with respect to the client 104. In other embodiments, the available content list 131 is generated as a function of nearby clients 104 and where the client is within a geographic boundary 127 defined with respect to the geographic location 124 of the nearby clients.

In embodiments in which an available content list 131 is generated as a function of nearby clients 104, the available content list 131 may be generated as a function of digital content 121 shared by the nearby clients 104. Shared digital content 121 may be the entirety or a subset of digital content 121 installed on a nearby client 104. The digital content 121 may be shared as a function of sharing settings 134. Other approaches may also be used to generate the available content list. After the available content list 131 has been generated it is communicated by the geographic content discovery application 117 via the network 107.

After the client 104 has obtained the available content list 131, the client 104 may initiate an acquisition of digital content 121 embodied in the available content list 131. In some embodiments, this comprises initiating a purchase, rental, or download of the digital content 121 that is consummated through the digital content distribution service 114. The acquisition of the digital content 121 may be facilitated by the client application 137 via a user interface, application program interface, or some other functionality.

In embodiments in which an available content list 131 is generated as a function of nearby clients 104, the acquisition of the digital content 121 may be facilitated by a peer-to-peer download of the digital content 121 from one or more of the nearby clients 104. Additionally, initiating an acquisition of shared digital content 121 may trigger an incentive associated with the sharing one of the nearby clients 104. For example, a user of one of the nearby clients 104 may receive credit, free or discounted content, or other incentives with respect to the digital content distribution service 144. A user of one of the nearby clients 104 may also receive financial rewards through an affiliate model. Other approaches may also be used to incentivize the sharing of digital content 121.

Other actions may also be performed responsive to the client 104 geographic location 124 being within a geographic boundary 127. For example, in some embodiments, the geographic content discovery application 117 may trigger a forced content push of digital content 121 to the client 104. In other embodiments, the geographic content discovery application 117 may communicate a response or other data to digital content 121 executed on the client 104 to unlock or trigger functionality of the digital content 121. For example, the geographic content discovery application 117 may communicate a response confirming that a client 104 is within a geographic boundary 127 that allows a client 104 to play a game for free that would otherwise require payment.

Figure 2:
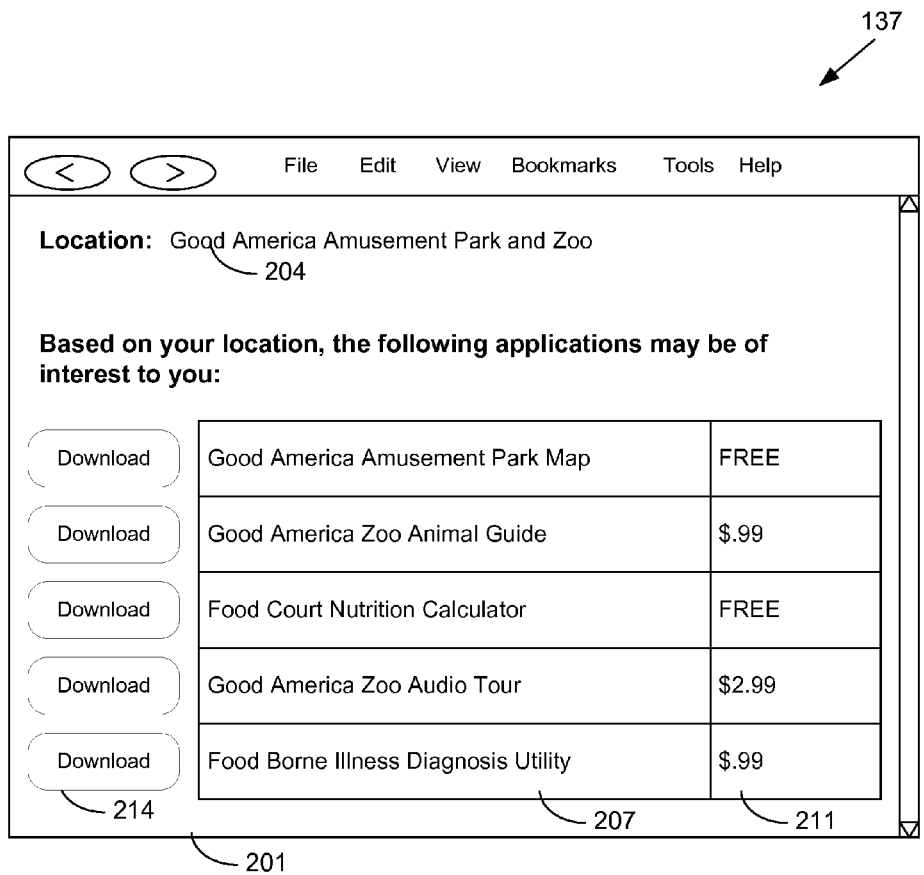
FIG. 2 is a drawing of an example of a user interface rendered by a client in the networked environment of FIG. 1 according to various embodiments of the present disclosure.

Referring next to FIG. 2, shown is an example user interface of a user interface rendered by a client application 137 (FIG. 1) executed by a client 104 (FIG. 1). Item 201 depicts a user interface rendered on a dedicated client application 137 executed on the client 104. Alternatively, item 201 may comprise a network page rendered on a browser client application 137. Item 204 is an identifier indicating to a user of the client 104 that they are within a geographic boundary 127 (FIG. 1) associated with the "Good America Amusement Park and Zoo" as determined by the geographic content discovery application 117 (FIG. 1) as a function of the geographic location 124 (FIG. 1) of the client 104.

Item 207 is an available content list 131 (FIG. 1) embodying digital content 121 (FIG. 1) relevant to the geographic boundary 127 occupied by the client 104. Item 211 is a list of prices corresponding to each of the digital contents 121 embodied in the available content list 131. Item 214 is a button to initiate a download of the corresponding one of the digital contents 121 consummated through the digital content distribution service 114 (FIG. 1).

Figure 3:
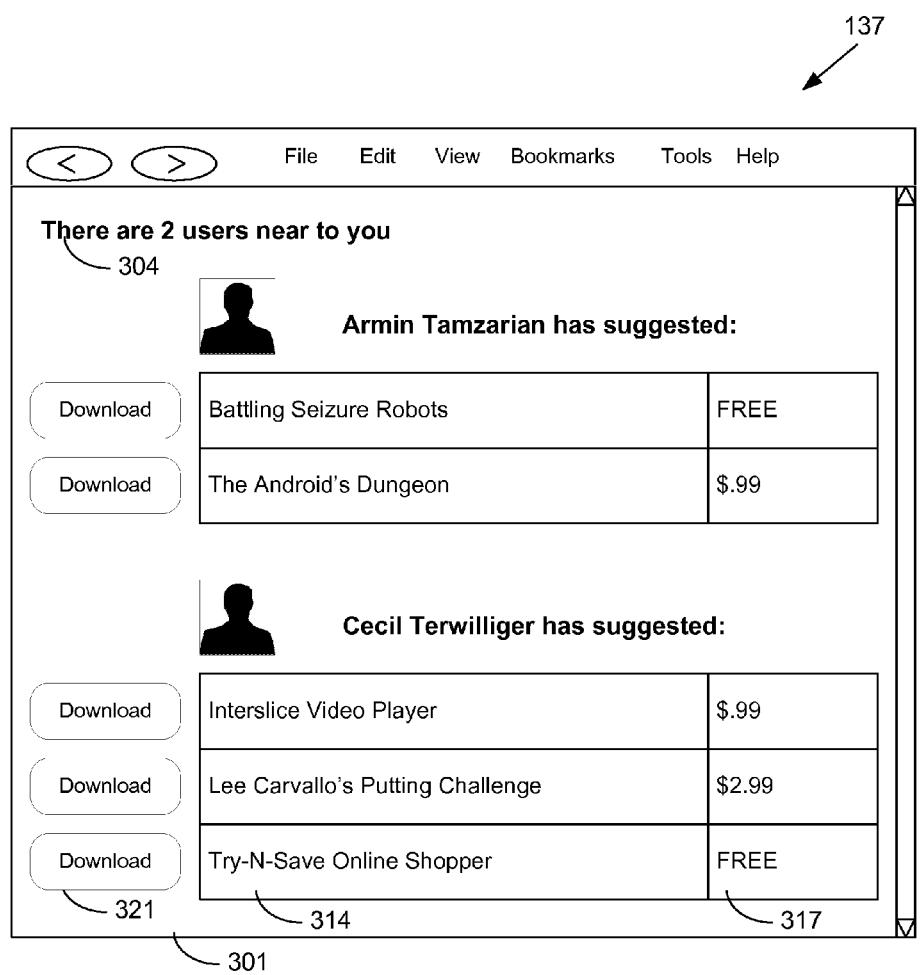
FIG. 3 is a drawing of an example of a user interface rendered by a client in the networked environment of FIG. 1 according to various embodiments of the present disclosure.

Turning now to FIG. 3, shown is example user interface of a user interface rendered by a client application 137 (FIG. 1) executed by a client 104 (FIG. 1). Item 301 depicts a user interface rendered on a dedicated client application 137 executed on the client 104. Alternatively, item 301 may comprise a network page rendered on a browser client application 137. Item 304 is a notification indicating that client 104 occupies at least one geographic boundary 127 (FIG. 1) associated with two other nearby clients 104. Item 307 indicates a name and user icon of a nearby client 104. Item 314 is an available content list 131 (FIG. 1) embodying digital content 121 (FIG. 1) shared by the nearby clients 104. Item 317 is a list of prices corresponding to each of the digital contents 121 embodied in the available content list 131. Item 321 is a button to initiate a download of the corresponding one of the digital contents 121 consummated through the digital content distribution service 114 (FIG. 1).

Figure 4:
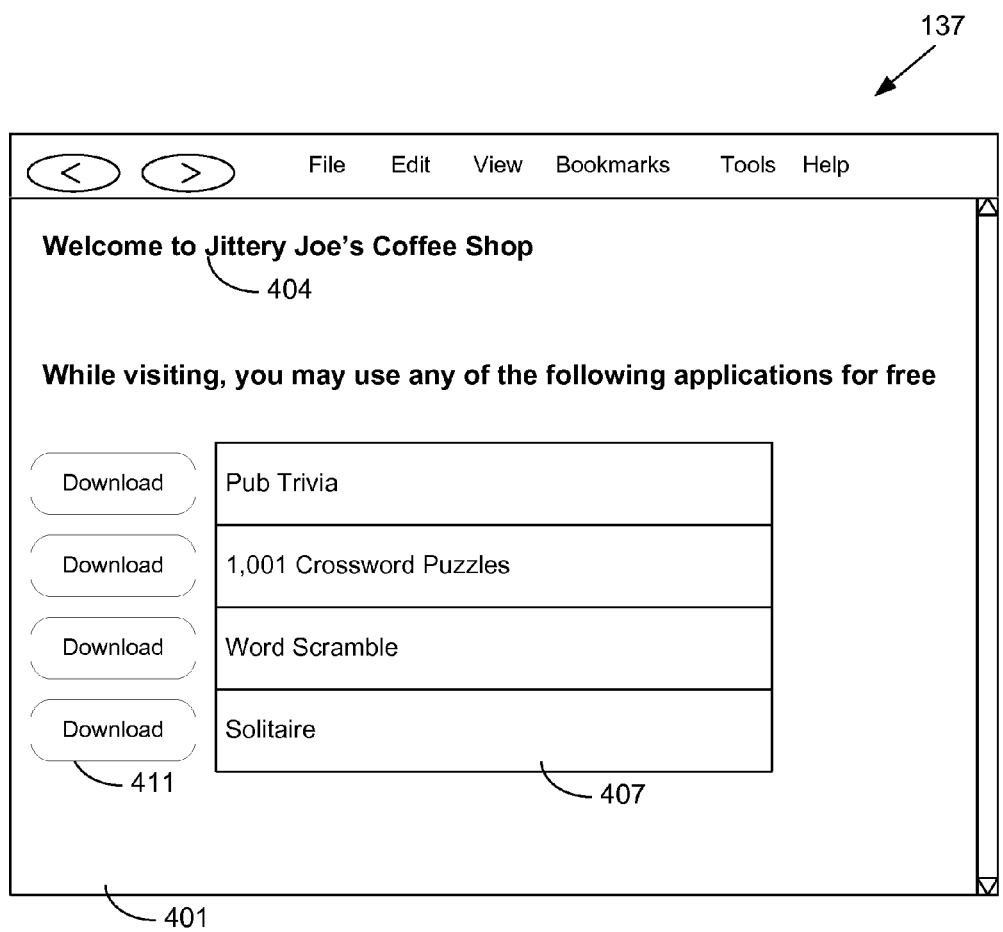
FIG. 4 is a drawing of an example of a user interface rendered by a client in the networked environment of FIG. 1 according to various embodiments of the present disclosure.

Moving on to FIG. 4, shown is an example user interface of a user interface rendered by a client application 137 (FIG. 1) executed by a client 104 (FIG. 1). Item 401 depicts a user interface rendered on a dedicated client application 137 executed on the client 104. Alternatively, item 401 may comprise a network page rendered on a browser client application 137. Item 304 is an identifier indicating to a user of the client 104 that they are within a geographic boundary 127 (FIG. 1) associated with "Jittery Joe's Coffee Shop" as determined by the geographic content discovery application 117 (FIG. 1) as a function of the geographic location 124 (FIG. 1) of the client 104.

Item 407 is an available content list 131 (FIG. 1) embodying digital content 121 (FIG. 1) associated with the geographic boundary 127 occupied by the client 104. Item 411 is a button to initiate a download of the corresponding one of the digital contents 121 consummated through the digital content distribution service 114 (FIG. 1).

Figure 5:
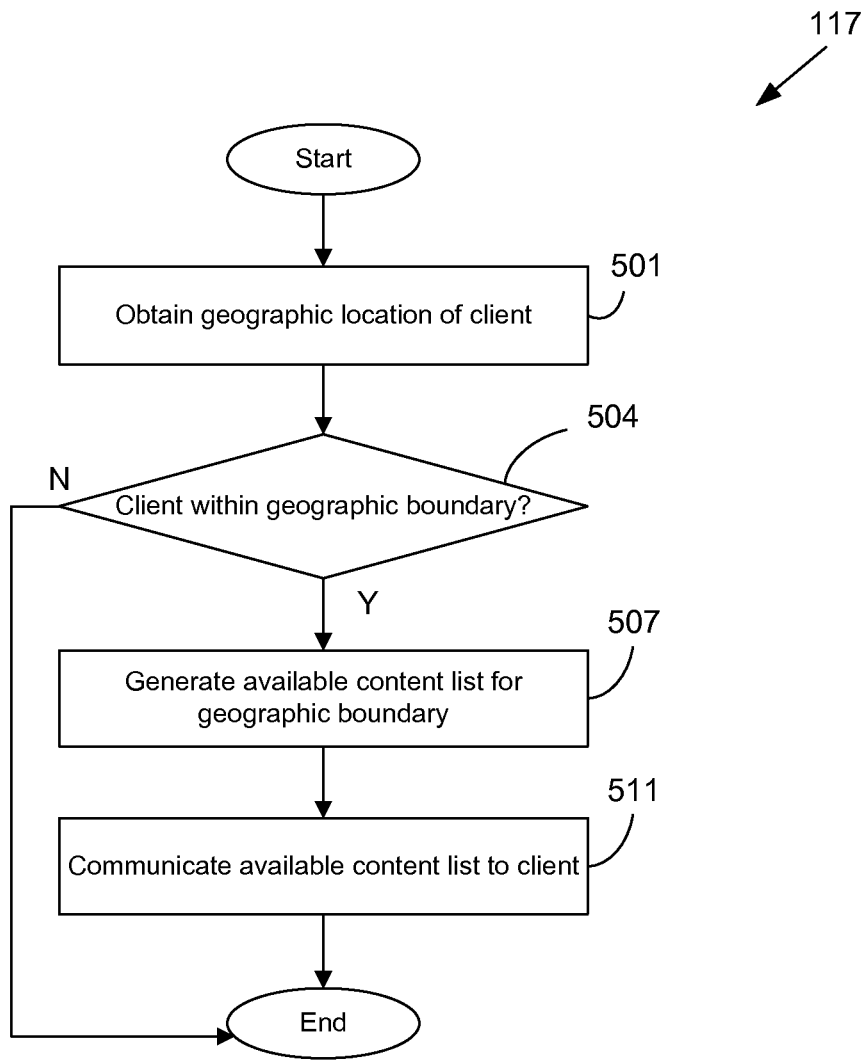
FIG. 5 is a flowchart illustrating one example of functionality implemented as portions of a geographic content discovery application executed in a computing environment in the networked environment of FIG. 1 according to various embodiments of the present disclosure.

Referring next to FIG. 5, shown is a flowchart that provides one example of the operation of a portion of the geographic content discovery application 117 (FIG. 1) according to various embodiments. It is understood that the flowchart of FIG. 5 provides merely an example of the many different types of functional arrangements that may be employed to implement the operation of the portion of the geographic content discovery application 117 as described herein. As an alternative, the flowchart of FIG. 5 may be viewed as depicting an example of steps of a method implemented in the computing environment 101 (FIG. 1) according to one or more embodiments.

FIG. 5 embodies the discovery of digital content 121 (FIG. 1) relevant to a geographic boundary 127 (FIG. 1) occupied by a client 104. Beginning with box 501, the geographic content discovery application 117 obtains a geographic location 124 (FIG. 1) of a client 104 (FIG. 1). The geographic location 124 may be communicated by the client 104 as facilitated by a client application 137 (FIG. 1), executed digital content 121 or by another approach.

Next, in box 504, the geographic content discovery application 117 determines if the client 104 is within a geographic boundary 127 (FIG. 1) as a function of the obtained geographic location 124 (FIG. 1). Determining whether the client 104 is within a geographic boundary may comprise loading one or more predefined geographic boundaries 127 from a data store 111 (FIG. 1), or dynamically calculating a geographic boundary 127 as a function of some data. Determining whether the client 104 is within a geographic boundary 127 may also comprise determining whether the geographic location 124 is within the area of a polygon defined by one or more reference points, within a circle defined by a reference point and a radius, or within some other area.

If the client 104 is not within a geographic boundary 127 the process ends. Otherwise, the process proceeds to box 507 where the geographic content discovery application 117 generates an available content list 131 (FIG. 1) for the geographic boundary 127. This may comprise loading a predefined available content list 131 associated with the occupied geographic boundary 131 from a data store 111, or by some other approach.

The available content list 131 may comprise data encoded for rendering by a dedicated content application 137. The available content list 131 may also comprise a network page for rendering by a browser content application 137. The available content list 131 may also comprise other data. In box 511 the available content list 131 is communicated to the client 104. This may be accomplished via the network 107 or some other approach. After communicating the available content list 137 to the client 104 the process ends.

Figure 6:
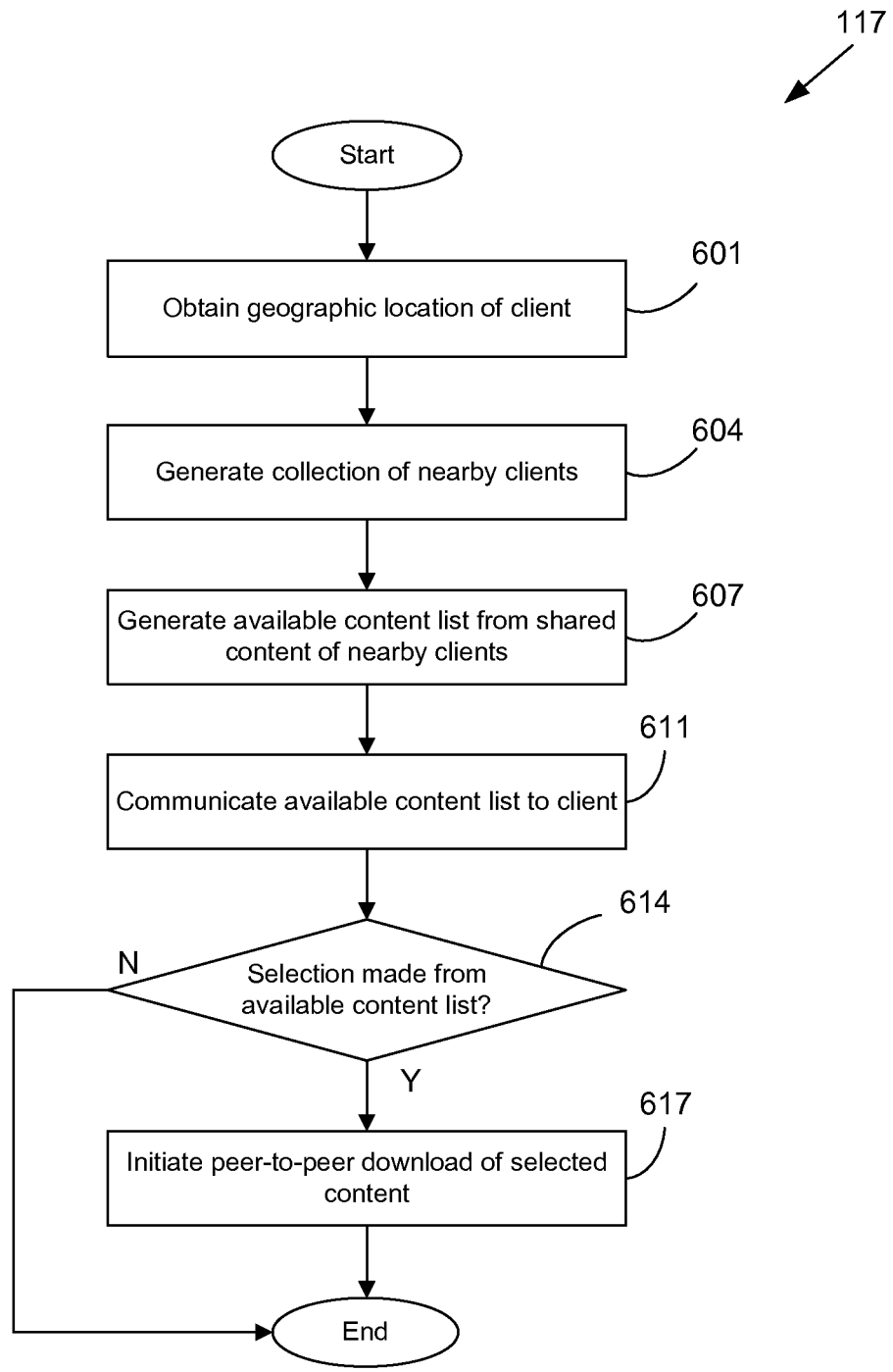
FIG. 6 is a flowchart illustrating one example of functionality implemented as portions of a geographic content discovery application executed in a computing environment in the networked environment of FIG. 1 according to various embodiments of the present disclosure.

Turning next to FIG. 6, shown is a flowchart that provides one example of the operation of a portion of the geographic content discovery application 117 (FIG. 1) according to various embodiments. It is understood that the flowchart of FIG. 6 provides merely an example of the many different types of functional arrangements that may be employed to implement the operation of the portion of the geographic content discovery application 117 as described herein. As an alternative, the flowchart of FIG. 6 may be viewed as depicting an example of steps of a method implemented in the computing environment 101 (FIG. 1) according to one or more embodiments.

FIG. 6 embodies the discovery of digital content 121 (FIG. 1) shared by geographically near clients 104 (FIG. 1). Beginning with box 601, the geographic content discovery application 117 obtains a geographic location 124 (FIG. 1) of a client 104. The geographic location 124 may be communicated by the client 104 as facilitated by a client application 137 (FIG. 1), executed digital content 121 or by another approach.

Next, in box 604, the geographic content discovery application 117 generates a collection of nearby clients 104. This may comprise a determination of whether the client 104 is within geographic boundary 127 (FIG. 1) generated as a function of a nearby client 104. This may also comprise a determination of those nearby clients 104 whose geographic locations 124 (FIG. 1) are within a geographic boundary 127 generated as a function of the client 104. Other approaches may also be used to generate the collection of nearby clients 104.

In box 607 the geographic content discovery application 117 generates an available content list 131 (FIG. 1) as a function of digital content 121 (FIG. 1) shared by the nearby clients 104. The digital content 121 shared by the nearby clients 104 bay be a function of sharing settings 134 implemented with respect to the nearby clients 104. For example, the digital content 121 may comprise a subset of digital content 121 selected for sharing. As another example, the digital content 121 may be shared to a subset of clients 104 distinct from the nearby client 104. The available content list 131 may also be generated by another approach.

Figure 7:
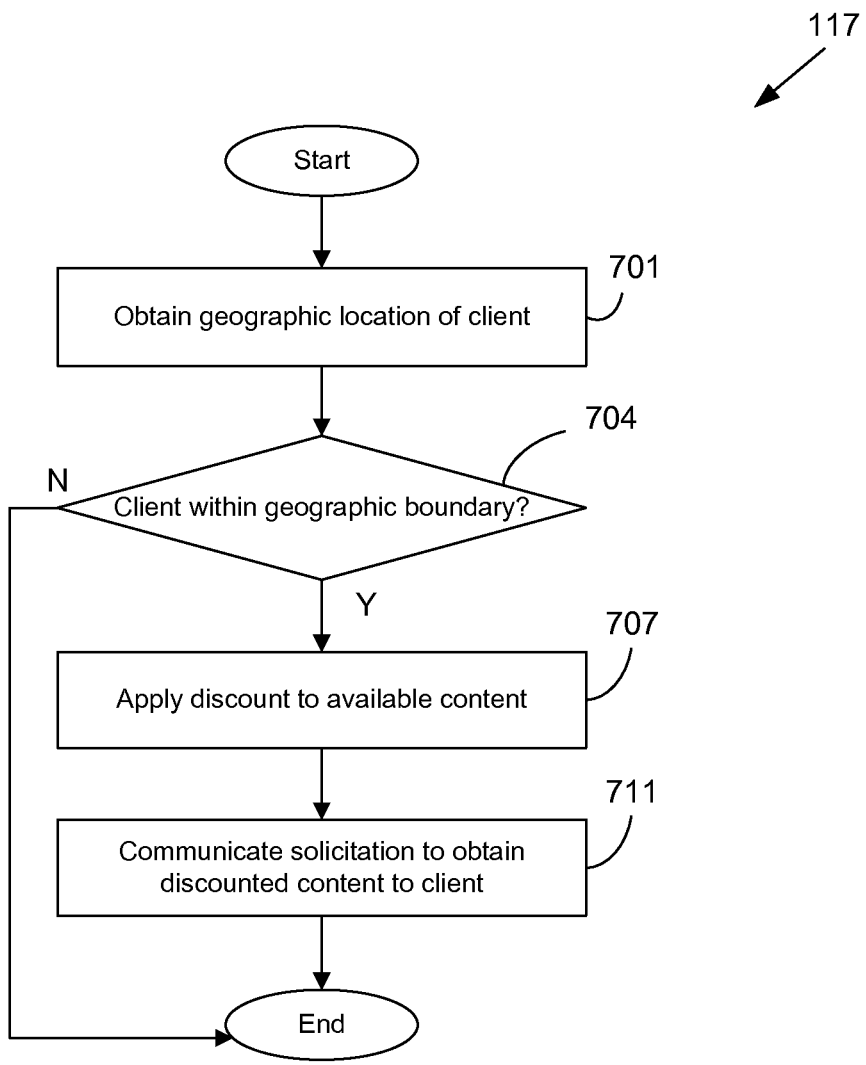
FIG. 7 is a flowchart illustrating one example of functionality implemented as portions of a geographic content discovery application executed in a computing environment in the networked environment of FIG. 1 according to various embodiments of the present disclosure.

In box 611 the geographic content discovery application 117 communicates the available content list 131 to the client 104 via the network 107 (FIG. 1). In box 614 a determination is made as to whether the client 104 selects digital content 121 from the available content list 131. If the client 104 does not select digital content 121 from the available content list 131 the process ends. If the client 104 selects digital content 121 from the available content list 131 the process proceeds to box 617 where a peer-to-peer download of the selected digital content 121 is initiated, after which the process ends Referring next to FIG. 7, shown is a flowchart that provides one example of the operation of a portion of the geographic content discovery application 117 (FIG. 1) according to various embodiments. It is understood that the flowchart of FIG. 7 provides merely an example of the many different types of functional arrangements that may be employed to implement the operation of the portion of the geographic content discovery application 117 as described herein. As an alternative, the flowchart of FIG. 7 may be viewed as depicting an example of steps of a method implemented in the computing environment 101 (FIG. 1) according to one or more embodiments.

FIG. 7 embodies the application of a discount to a future purchase of digital content 121 (FIG. 1) associated with a geographic boundary 127 (FIG. 1) occupied by a client 104. Beginning with box 701, the geographic content discovery application 117 obtains a geographic location 124 (FIG. 1) of a client 104 (FIG. 1). The geographic location 124 may be communicated by the client 104 as facilitated by a client application 137 (FIG. 1), executed digital content 121 or by another approach.

Next, in box 704, the geographic content discovery application 117 determines if the client 104 is within a geographic boundary 127 (FIG. 1) as a function of the obtained geographic location 124 (FIG. 1). Determining whether the client 104 is within a geographic boundary may comprise loading one or more predefined geographic boundaries 127 from a data store 111 (FIG. 1), or dynamically calculating a geographic boundary 127 as a function of some data. Determining whether the client 104 is within a geographic boundary 127 may also comprise determining whether the geographic location 124 is within the area of a polygon defined by one or more reference points, within a circle defined by a reference point and a radius, or within some other area.

If the client 104 is not within a geographic boundary 127 the process ends. Otherwise, the process proceeds to box 707 where the geographic content discovery application 117 applies a discount to a future purchase of digital content 121 embodied in an available content list 131 (FIG. 1) associated with the geographic boundary 127. This may comprise loading a predefined available content list 131 associated with the occupied geographic boundary 131 from a data store 111, or by some other approach. The discount may expire upon the client 104 exiting the geographic boundary 127, expire after a time period triggered upon exiting the geographic boundary 127, or not expire. Additionally, the discount may be valid for purchases of the digital content 121 to the client 104. In other embodiments, the discount may be valid for a plurality of clients 104 associated with a user account or other identifier. The discount may be valid or applied as a function of other criteria.

Next, in box 711 the geographic content discovery application 117 communicates a solicitation to obtain the discounted digital content 121 to the client 104. The solicitation may comprise an available content list. The available content list 131 may comprise data encoded for rendering by a dedicated content application 137. The available content list 131 may also comprise a network page for rendering by a browser content application 137. Additionally, the solicitation may comprise a push notification or another notification. After communicating the solicitation to the client 104 the process ends.

Figure 8:
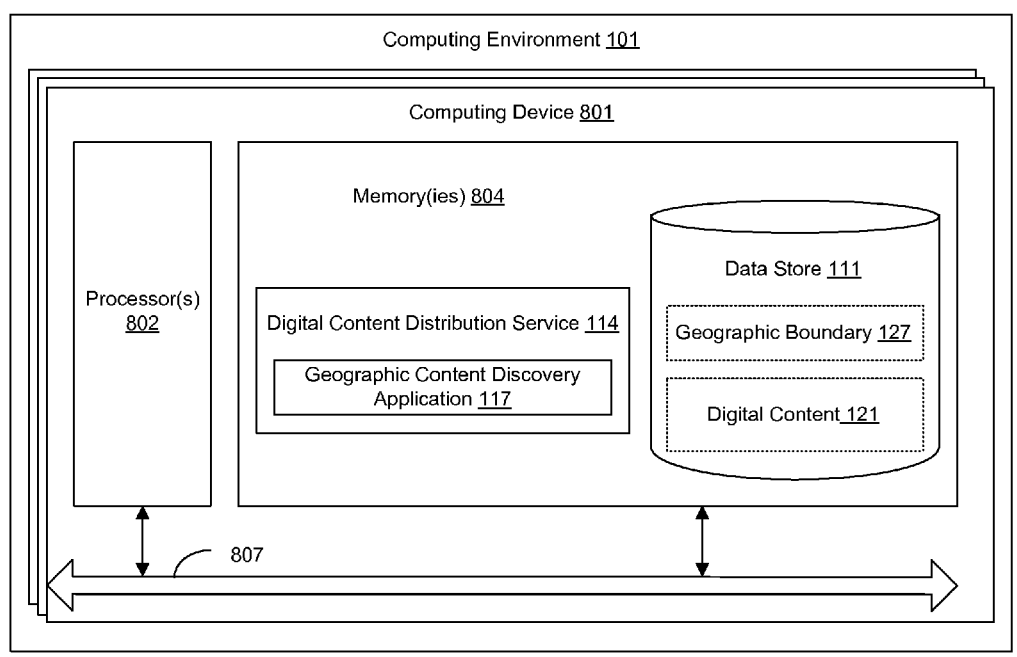
FIG. 8 is a schematic block diagram that provides one example illustration of a computing environment employed in the networked environment of FIG. 1 according to various embodiments of the present disclosure.

With reference to FIG. 8, shown is a schematic block diagram of the computing environment 101 according to an embodiment of the present disclosure. The computing environment 101 includes one or more computing devices 801. Each computing device 801 includes at least one processor circuit, for example, having a processor 802 and a memory 804, both of which are coupled to a local interface 807. To this end, each computing device 801 may comprise, for example, at least one server computer or like device. The local interface 807 may comprise, for example, a data bus with an accompanying address/control bus or other bus structure as can be appreciated.

Stored in the memory 804 are both data and several components that are executable by the processor 802. In particular, stored in the memory 804 and executable by the processor 802 are a digital content distribution service 114 (FIG. 1) having a geographic content discovery application 117 (FIG. 1), and potentially other applications. Also stored in the memory 804 may be a data store 111 (FIG. 1) storing geographic boundaries 127 (FIG. 1) and digital content 121 (FIG. 1), and potentially other data. In addition, an operating system may be stored in the memory 804 and executable by the processor 802.

It is understood that there may be other applications that are stored in the memory 804 and are executable by the processor 802 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, source code that may be expressed in proper format such as object code that is capable of being loaded into a random access portion of the memory 804 and executed by the processor 802, or source code that may be interpreted by another executable program to generate instructions in a random access portion of the memory 804 to be executed by the processor 802, etc. An executable program may be stored in any portion or component of the memory 804 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 804 is defined herein as including both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and/or multiple processor cores and the memory 804 may represent multiple memories 804 that operate in parallel processing circuits, respectively. In such a case, the local interface 807 may be an appropriate network that facilitates communication between any two of the multiple processors 802, between any processor 802 and any of the memories 804, or between any two of the memories 804, etc. The local interface 807 may comprise additional systems designed to coordinate this communication, including, for example, performing load balancing. The processor 802 may be of electrical or of some other available construction.

Although the geographic content discovery application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5, 6, and 7 show the functionality and operation of an implementation of portions of the geographic content discovery application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 802 in a computer system or other system. The machine code may be converted from the source code, etc. If embodied in hardware, each block may represent a circuit or a number of interconnected circuits to implement the specified logical function(s).

Although the flowcharts of FIGS. 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 5, 6, and 7 may be executed concurrently or with partial concurrence. Further, in some embodiments, one or more of the blocks shown in FIGS. 5, 6, and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the geographic content discovery application 117, that comprises software or code can be embodied in any non-transitory computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device comprising at least one processor and at least one memory; and
    a geographic content discovery application executable by the at least one computing device, the geographic content discovery application configured to at least perform:
        receiving, from a user client device, a geographic location associated with the user client device, wherein the geographic location is generated by a global positioning system (GPS) receiver of the user client device;
        determining that the user client device is located within a geographic boundary;
        determining a plurality of digital content stored on a plurality of proximate user client devices that are distinct from the user client device and available for sharing with the user client device within the geographic boundary;
        generating an available content list comprising a web page listing the plurality of digital content stored on the plurality of the proximate user client devices; and
        transmitting, through a network to a browser content application of the user client device, the available content list on the web page, wherein the available content list on the web page is displayed on the browser content application of the user client device and the plurality of digital content is available for download through a peer-to-peer download from at least one of the plurality of proximate user client devices.

2. The system of claim 1, wherein the available content list is generated as a function of digital content sharing preferences implemented on the at least one of the plurality of proximate user client devices.

3. The system of claim 1, wherein the geographic content discovery application is further configured to perform initiating the peer-to-peer download of at least one digital content from the at least one of the plurality of proximate user client devices to the user client device.

4. The system of claim 1, wherein the available content list further comprises a predefined list of digital content relevant with respect to the geographic boundary.

5. The system of claim 1, wherein the plurality of digital content comprises functionality whose use is restricted in response to the user client device being outside the geographic boundary.

6. The system of claim 1, wherein the available content list further comprises at least one discount with respect to a future purchase of at least one digital content.

7. The system of claim 6, wherein the at least one discount expires responsive to the user client device being outside of the geographic boundary.

8. The system of claim 6, wherein the at least one discount expires at a predefined future time as a function of a time the user client device exits the geographic boundary.

9. The system of claim 1, wherein the plurality of digital content comprises functionality whose use is restricted responsive to the user client device being outside the geographic boundary.

10. The system of claim 1, wherein the geographic boundary is dynamically generated as a function of a weather pattern.

11. The system of claim 1, wherein the plurality of digital content comprises at least one of an application or an unlocking of a functionality for a previously obtained application.

12. A method comprising:
    receiving, by a geographic content discovery application executed by at least one computing device, a geographic location from a user client device, wherein the geographic location is associated with the user client device and is generated by a global positioning system (GPS) receiver of the user client device;

determining, by the geographic content discovery application executed by the at least one computing device, that the user client device is within a geographic boundary;

determining, by the geographic content discovery application executed by the at least one computing device, a plurality of digital content stored on each of a plurality of proximate user client devices that are distinct from the user client device and available for sharing with the user client device within the geographic boundary;

generating, by the geographic content discovery application executed by the at least one computing device, an available content list comprising a web page listing the plurality of digital content stored on the plurality of the proximate user client devices; and transmitting, by the geographic content discovery application executed by the at least one computing device through a network to a browser content application of the user client device, the available content list on the web page, wherein the available content list on the web page is displayed on the browser content application of the user client device and the plurality of digital content is available for download through a peer-to-peer download from at least one of the plurality of proximate user client devices.

13. The method of claim 12, wherein the generating the available content list further comprises obtaining, from a digital content distribution service, a predefined list of digital content relevant with respect to the geographic boundary.

14. The method of claim 13, wherein the generating the available content list further comprises obtaining, from the digital content distribution service, an offer to purchase at least one digital content in the predefined list at a discounted price.

15. The method of claim 14, wherein the offer to purchase the at least one digital content at the discount price expires responsive to the user client device being outside the geographic boundary.

16. The method of claim 12, wherein the available content list comprises an application program interface call to restrict functionality of at least one of the plurality of digital content as a function of a geographic location of the user client device and the geographic boundary.

17. The method of claim 12, wherein the geographic boundary comprises an altitude threshold.

18. The method of claim 12, wherein the geographic boundary comprises a geographic reference point and a radius applied to the geographic reference point.

19. The method of claim 12, wherein the geographic boundary comprises a plurality of connected geographic reference points.

20. The method of claim 12, wherein the user client device obtains at least a portion of the plurality of digital content via the peer-to-peer download from one of the plurality of proximate user client devices.

21. The method of claim 12, further comprising determining the geographic boundary as a function of a weather pattern.

22. The method of claim 12, wherein the generating the available content list is performed as a function of sharing permissions implemented on the plurality of proximate user client devices, the sharing permissions restricting accessing the plurality of digital content stored on the plurality of proximate user client devices.

23. A non-transitory computer readable medium embodying a program executable in a computing device, the program, when executed by a processor, causes the computing device to at least:

receive a geographic location from a user client device, wherein the geographic location is associated with the user client device and is generated by a global positioning system (GPS) receiver of the user client device;

determine that the user client device is within a geographic boundary;

determine a plurality of digital content stored on each of a plurality of proximate user client devices that are distinct from the user client device and available for sharing with the user client device within the geographic boundary;

generate an available content list comprising a web page listing the plurality of digital content stored on the plurality of the proximate user client devices; and transmit, through a network to a browser content application of the user client device, the available content list on the web page, wherein the available content list on the web page is displayed on the browser content application of the user client device and the plurality of digital content is available for download through a peer-to-peer download from at least one of the plurality of proximate user client devices.

24. The non-transitory computer readable medium of claim 23, the program further causing the user client device to obtain at least a portion of the plurality of digital content via the peer-to-peer download from one of the plurality of proximate user client devices.

* * * * *